United States Patent
Lim

(10) Patent No.: US 9,632,343 B2
(45) Date of Patent: *Apr. 25, 2017

(54) LIQUID CRYSTAL DISPLAY MODULE FOR PORTABLE TERMINAL

(71) Applicant: Samsung Electronics Co., Ltd., Suwon-si, Gyeonggi-do (KR)

(72) Inventor: Sil-Kuy Lim, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/155,505

(22) Filed: May 16, 2016

(65) Prior Publication Data
US 2016/0259204 A1 Sep. 8, 2016

Related U.S. Application Data

(63) Continuation of application No. 13/766,248, filed on Feb. 13, 2013, now Pat. No. 9,341,890, which is a continuation of application No. 12/794,992, filed on Jun. 7, 2010, now Pat. No. 8,395,720.

(30) Foreign Application Priority Data

Jun. 9, 2009 (KR) .................. 10-2009-0051146

(51) Int. Cl.
G02F 1/1333 (2006.01)
H04M 1/02 (2006.01)
G02F 1/1335 (2006.01)

(52) U.S. Cl.
CPC .. *G02F 1/133308* (2013.01); *G02F 1/133608* (2013.01); *H04M 1/0266* (2013.01); *G02F 2001/133314* (2013.01)

(58) Field of Classification Search
None
See application file for complete search history.

(56) References Cited

U.S. PATENT DOCUMENTS

| | | |
|---|---|---|
| 6,549,263 B1 | 4/2003 | Kim |
| 7,452,121 B2 | 11/2008 | Cho et al. |
| 7,586,744 B2 | 9/2009 | Okuda |

(Continued)

FOREIGN PATENT DOCUMENTS

| | | | |
|---|---|---|---|
| JP | 2009-98427 A | 5/2009 | |
| KR | 20-0402161 Y1 | 11/2005 | |

(Continued)

*Primary Examiner* — Richard Kim
(74) *Attorney, Agent, or Firm* — Jefferson IP Law, LLP

(57) ABSTRACT

A portable terminal including a Liquid Crystal Display (LCD) module is provided. The LCD module includes a reinforcement plate having a bottom surface and a side surface bent to extend from the bottom surface, wherein the reinforcement plate comprises a plurality of molding holes provided in a boundary portion between the bottom surface and the side surface of the reinforcement plate, a backlight unit coupled to an upper part of the reinforcement plate, a frame molded to the reinforcement plate, and an LCD panel coupled to an upper part of the backlight unit, wherein each of the plurality of molding holes extends into both the bottom surface and the side surface from the boundary portion between the bottom surface and the side surface.

14 Claims, 4 Drawing Sheets

(56) References Cited

U.S. PATENT DOCUMENTS

| | | |
|---|---|---|
| 7,679,694 B2 | 3/2010 | Shirai |
| 8,395,720 B2 | 3/2013 | Lim |
| 8,811,036 B2 | 8/2014 | Sakai et al. |
| 9,341,890 B2 * | 5/2016 | Lim .................. G02F 1/133308 |
| 2003/0011550 A1 | 1/2003 | You |
| 2003/0043310 A1 | 3/2003 | Cho |
| 2006/0146577 A1 | 7/2006 | Hsieh et al. |
| 2006/0171172 A1 | 8/2006 | Li et al. |
| 2007/0002206 A1 | 1/2007 | Shirai |
| 2007/0041212 A1 | 2/2007 | Cho et al. |
| 2007/0120878 A1 | 5/2007 | Hsiao et al. |
| 2008/0136995 A1 | 6/2008 | Oohira |
| 2008/0273139 A1 | 11/2008 | Sugawara et al. |
| 2009/0122217 A1 | 5/2009 | Chen et al. |
| 2010/0188597 A1 | 7/2010 | Koike et al. |

FOREIGN PATENT DOCUMENTS

| | | |
|---|---|---|
| KR | 10-2006-0076732 A | 7/2006 |
| KR | 10-2007-0020823 A | 2/2007 |
| WO | 2007/036577 A1 | 4/2007 |
| WO | 2008/143418 A1 | 11/2008 |

\* cited by examiner

LIQUID CRYSTAL DISPLAY MODULE FOR PORTABLE TERMINAL

CROSS-REFERENCE TO RELATED APPLICATION(S)

This application is a continuation of prior application Ser. No. 13/766,248, filed on Feb. 13, 2013, which was a continuation of U.S. application Ser. No. 12/794,992, filed on Jun. 7, 2010, which claims the benefit under 35 U.S.C. §119(a) of a Korean patent application filed in the Korean Intellectual Property Office on Jun. 9, 2009 and assigned Serial No. 10-2009-0051146, the entire disclosure of which is hereby incorporated by reference.

BACKGROUND OF THE INVENTION

1. Field of the Invention

The present invention relates to a display device for a portable terminal. More particularly, the present invention relates to a Liquid Crystal Display (LCD) module for a portable terminal having an improved assembly structure.

2. Description of the Related Art

Many different kinds of electronic communication equipment now include display devices using LCD modules. As a display device, the LCD module informs a user of the various manipulation states of the equipment, such as receipt of an incoming message, etc. Use of an LCD module as a display device provides several advantages based on its smaller size. Portable terminals, for example, are increasingly being fabricated with LCD modules and are thus being made lighter and thinner and are generally being miniaturized while being diversified in function. Also, to meet a diversity of user's desires, portable terminals having various constructions are now being put on the market.

Many of the diverse functions now provided for a portable terminal are based on the use of the LCD module. For example, portable terminals are being made slimmer for ease of portability and to address weight considerations, while also getting wider for the sake of improving visibility of the LCD module. To achieve both a slimmer portable terminal and a wider viewing screen, terminal manufacturers have put much effort into improving the assembly of respective constituent elements of the LCD module.

A recent trend for producing LCD modules is the use of high-pixel-resolution Thin Film Transistors (TFTs). An LCD module using a high-pixel-resolution TFT is better able to meet a consumer's desire for a high definition display device. However, because the TFT LCD module is relatively thin, the TFT LCD module includes a reinforcement plate made of Stainless Steel (STS) material. Typically, the reinforcement plate is applied to the back side of the TFT LCD module to prevent damage.

In more detail, the LCD module includes a metal plate, a backlight unit laminated on an upper part of the metal plate, and an LCD panel attached to an upper part of the backlight unit. Typically, the backlight unit has a frame made of synthetic resin material at its edge, and is fixed by way of a process of insert molding the frame to the reinforcement plate.

The reinforcement plate has a bottom surface and a side surface bent to have three or more edges. The backlight unit is fixed to the reinforcement plate by insert molding the frame of the backlight unit to the side surface of the reinforcement plate. A plurality of molding holes are provided in the bottom surface of the reinforcement plate such that part of the frame of the backlight unit is introduced into the molding holes and performs a close fixing action.

Using the above described construction, the conventional LCD module includes a side wall of the frame between a side surface of the LCD panel and a side surface of the reinforcement plate. As a result, the conventional LCD module has a thickness that includes the side surface of the frame and the side surface of the reinforcement plate. Because of this configuration, the conventional LCD module provides a limited benefit in reducing the overall size of the equipment due to its own assembly structure.

SUMMARY OF THE INVENTION

An aspect of the present invention is to address at least the above-mentioned problems and/or disadvantages and to provide at least the advantages described below. Accordingly, an aspect of the present invention is to provide a Liquid Crystal Display (LCD) module for a portable terminal that contributes to a reduction in size of the portable terminal.

Another aspect of the present invention is to provide an LCD module for a portable terminal that is constructed to realize a decrease in width and length of the portable terminal.

In accordance with an aspect of the present invention, a portable terminal including a LCD module is provided. The LCD module includes a reinforcement plate having a bottom surface and a side surface bent to extend from the bottom surface, wherein the reinforcement plate comprises a plurality of molding holes provided in a boundary portion between the bottom surface and the side surface of the reinforcement plate, a backlight unit coupled to an upper part of the reinforcement plate, a frame molded to the reinforcement plate, and an LCD panel coupled to an upper part of the backlight unit, wherein each of the plurality of molding holes extends into both the bottom surface and the side surface from the boundary portion between the bottom surface and the side surface.

In accordance with an aspect of the present invention, a LCD module for a portable terminal including a display unit is provided. The LCD module includes a reinforcement plate having a bottom surface and a side surface bent to extend from the bottom surface, wherein the reinforcement plate comprises a plurality of molding holes provided in a boundary portion between the bottom surface and the side surface of the reinforcement plate, a backlight unit coupled to an upper part of the reinforcement plate, a frame molded to the reinforcement plate, and an LCD panel coupled to an upper part of the backlight unit, wherein each of the plurality of molding holes extends into both the bottom surface and the side surface from the boundary portion between the bottom surface and the side surface.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description when taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural references unless the context clearly dictates otherwise. Thus, for example, a reference to "a component surface" includes reference to one or more of such surfaces.

By the term "substantially" it is typically meant that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

In accordance with an exemplary embodiment of the present invention, a portable terminal is described, for example, but it is noted that the present invention is widely applicable to any of wired/wireless equipment to which Liquid Crystal Display (LCD) panels are applied.

Figure 1:
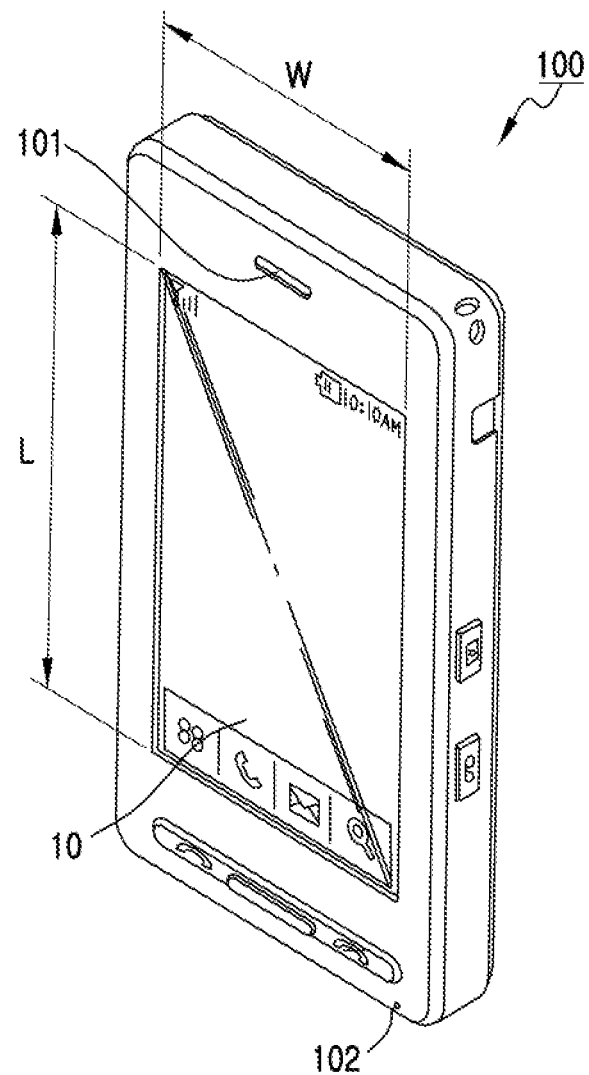
FIG. 1 is a perspective diagram illustrating a portable terminal including a Liquid Crystal Display (LCD) module according to an exemplary embodiment of the present invention.

FIG. 1 is a perspective diagram illustrating a portable terminal including an LCD module according to an exemplary embodiment of the present invention is applied.

Referring to FIG. 1, the portable terminal 100 is of a bar type. However, it is to be understood that application of the present invention can be to any type of portable terminal including a rotating type, a flip type, and the like. The bar type portable terminal 100 has a display device 10 installed on a front side. In an exemplary implementation, display device 10 includes an LCD module. The bar type portable terminal 100 further includes a speaker 101, and a receiver (not shown), installed on an upper part. Also, the bar type portable terminal 100 has a microphone 102, and a sender or transmitter (not shown), installed at a lower side.

In comparison with conventional LCD modules, application of the exemplary LCD module 10 of the present invention to the portable terminal 100 reduces a width (W) and length (L) of the portable terminal 100. That is, the exemplary LCD module 10 of the present invention, having an LCD panel of the same size as a conventional LCD module, is able to reduce the overall width (W) and length (L) of the portable terminal 100 as compared with application of a conventional LCD panel, thus assisting in reducing the overall size of the portable terminal 100 without reducing the size of the viewing region.

Figure 2:
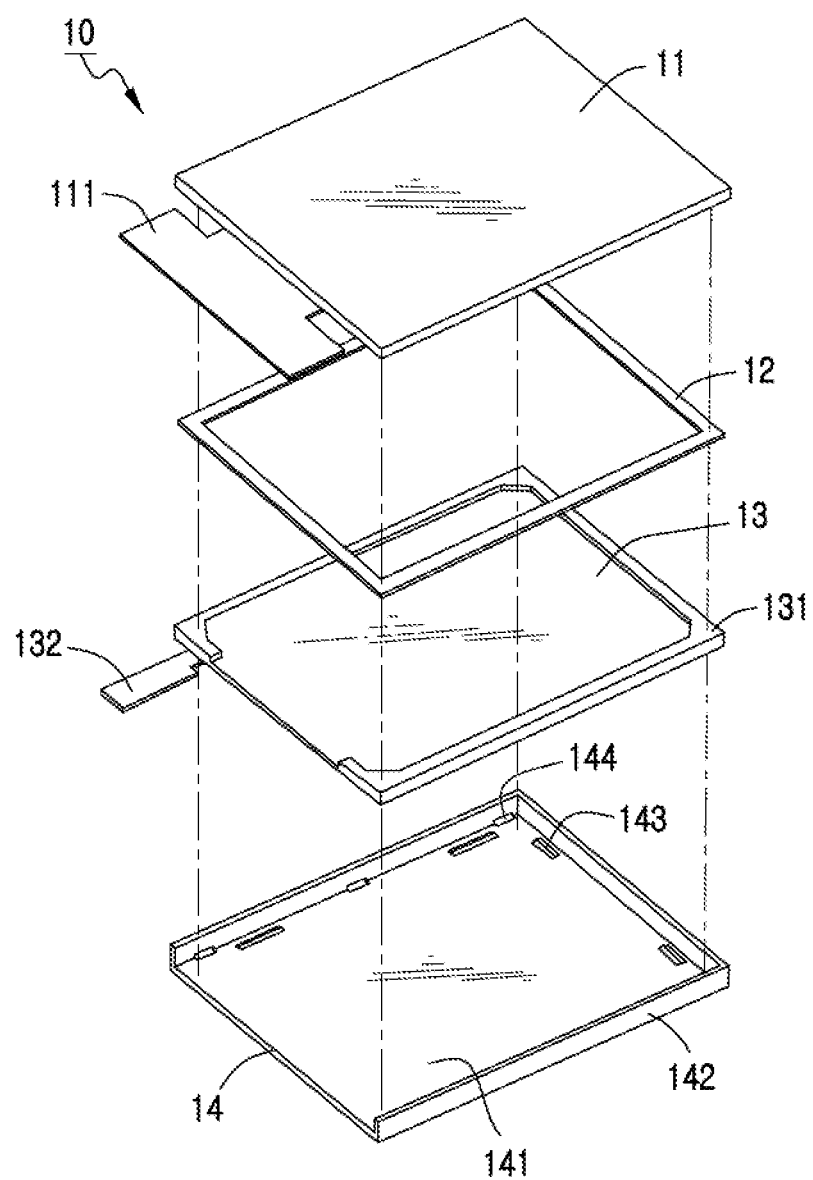
FIG. 2 is an exploded perspective diagram illustrating an LCD module according to an exemplary embodiment of the present invention.

FIG. 2 is an exploded perspective diagram illustrating an LCD module according to an exemplary embodiment of the present invention.

Referring to FIG. 2, the LCD module 10 includes a reinforcement plate 14, a backlight unit 13, a double-sided tape 12, and an LCD panel 11. In an exemplary implementation, the backlight unit 13 is laminated successively on the reinforcement plate 14.

The reinforcement plate 14 may be made of a metal material, for example, Stainless Steel (STS). Alternatively, the reinforcement plate 14 may be made of another type of metal or may be made from a non-metal material having physical characteristics such as rigidity similar to metal. The reinforcement plate 14 has a bottom surface 141, and a side surface 142 bent upwardly along an edge of the reinforcement plate 14 from the bottom surface 141. In an exemplary implementation, the side surface 142 is bent upward and extends by a constant height from the bottom surface 141. The side surface 142 of the reinforcement plate 14 is to support a frame 131 supporting the backlight unit 13, and is to prevent a breakaway of the frame 131 resulting from an insert molding process. In an exemplary implementation, the frame 131 is made of synthetic resin material.

A plurality of first molding holes 143 are provided at intervals in the bottom surface 141 of the reinforcement plate 14. A plurality of second molding holes 144 are provided at a boundary portion between the bottom surface 141 and the side surface 142. Accordingly, the frame 131 is partially introduced into the respective first and second molding holes 143 and 144 at the time of insert molding and, as a result, functions to firmly couple the backlight unit 13 with the reinforcement plate 14.

In addition, Flexible Printed Circuit Boards (FPCBs) 111 and 132 are coupled to and extend from the LCD panel 11 and the backlight unit 13, respectively, and are electrically connected to a PCB (not shown) of the portable terminal 100 for operation.

Figure 3:
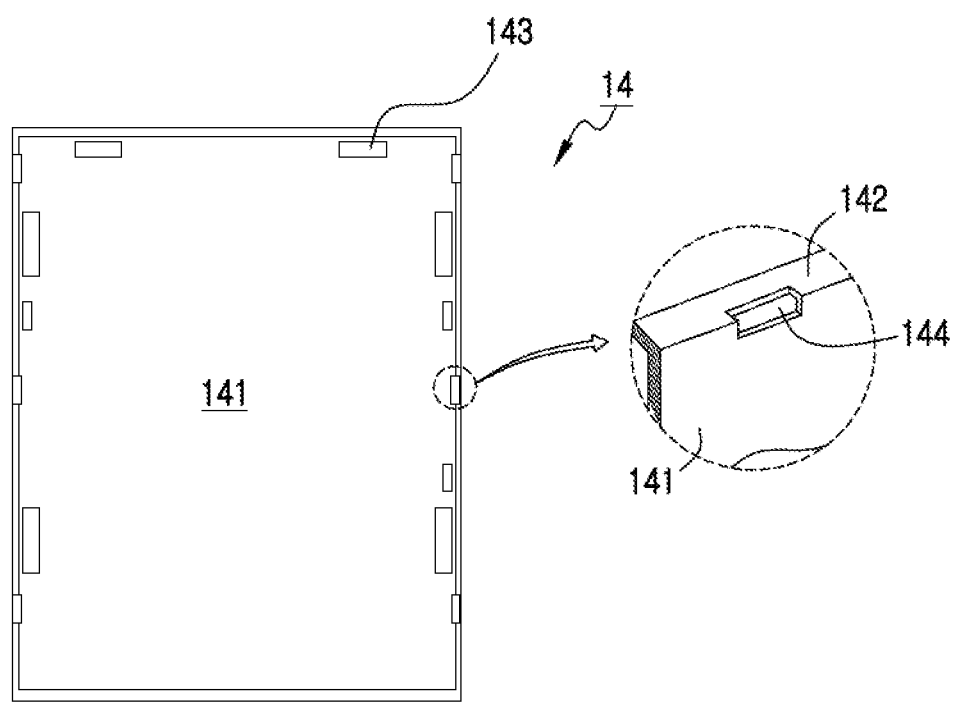
FIG. 3 is a plan diagram and a key-part perspective diagram illustrating a reinforcement plate according to an exemplary embodiment of the present invention.

FIG. 3 is a plan diagram and a key-part perspective diagram illustrating a reinforcement plate according to an exemplary embodiment of the present invention.

Referring to FIG. 3, first molding holes 143, which are provided in a bottom surface 141 of the reinforcement plate 14, perform a role of keeping a close hold on a frame 131 of a backlight unit 13 at the time of insert molding. However, the frame 131, according to an exemplary embodiment of the present invention, does not go up to a side surface of an LCD panel 11 at the time of assembly of an LCD module and therefore, there is a need to more closely fix the frame 131 to the reinforcement plate 14. For this purpose, the reinforcement plate 14 has second molding holes 144. As illustrated in FIG. 3, the second molding holes 144 are provided in the bottom surface 141 and side surface 142 of the reinforcement plate 14 at a boundary portion between the bottom surface 141 and side surface 142. That is, a frame mold of the backlight unit 13 is simultaneously supported by the bottom surface 141 and side surface 142 of the reinforcement plate 14 by way of the second molding holes 144 of the reinforcement plate 14 and therefore, the frame mold can be fixed more firmly.

Figure 4:
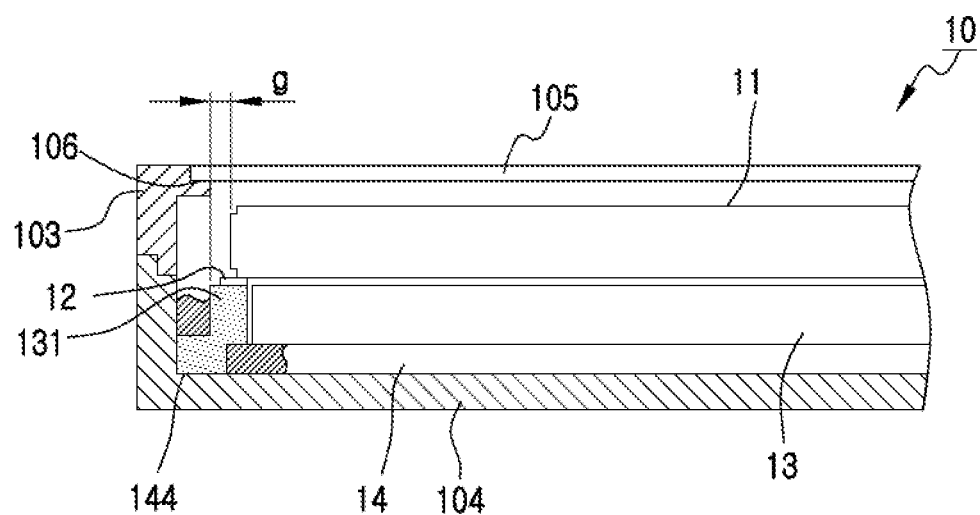
FIG. 4 is a key-part cross section illustrating an assembled state of an LCD module according to an exemplary embodiment of the present invention.

FIG. 4 is a key-part cross section illustrating an assembled state of an LCD module according to an exemplary embodiment of the present invention.

Referring to FIG. 4, an LCD module 10 includes a backlight unit 13 fixed to a reinforcement plate 14. A frame 131, which may be made of synthetic resin material and located along an edge of the backlight unit 13, is insert molded into second molding holes 144 provided in the bottom surface and side surface of the reinforcement plate 14 in addition to first molding holes 143. An LCD panel 11 is fixed by a double-sided tape 12 to an upper part of the backlight unit 13 whose frame 131 is insert molded to the reinforcement plate 14.

As illustrated in FIG. 4, the side surface of the reinforcement plate 14 extends above a top surface of the LCD panel 11. That is, the reinforcement plate 14 is formed to have a height greater than that of at least the mounted LCD panel 11 and the backlight unit 13. By configuring the side surface of the reinforcement plate 14 to extend above the top surface of the LCD panel 11 and by insert molding the frame 131 in the first molding holes 143 and the second molding holes 144, the LCD module 10 is provided with sufficient structural integrity such that the frame 131 need not be placed at a side surface of the LCD panel 11. That is, based on the configuration of the reinforcement plate 14 and the frame 131 being injection molded into both the first molding holes 143 and the second molding holes 144, the frame 131 is formed to have a height that does not extend up to the LCD panel 11 while still providing sufficient structure.

The aforementioned LCD module 10 is mounted within upper and lower case frames 103 and 104 of a terminal. Also, a transparent LCD window 105 is installed by way of a double-sided tape 106 to overlap with the LCD panel 11, thereby protecting the LCD panel 11 from external damage or contamination.

According to an exemplary embodiment of the present invention, a gap (g) between a side surface of the LCD panel 11 and an inner side surface of the reinforcement plate 14 does not include the frame 131 of the backlight unit 13 unlike the conventional LCD module. Therefore, the width and length of LCD module 10 can be reduced without deteriorating its structural integrity.

Accordingly, an LCD module according to an exemplary embodiment of the present invention has an effect of, although applying the same LCD panel, being capable of realizing a portable terminal having a reduced size as compared to the conventional art.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising a display module, the display module comprising:
    a reinforcement plate having a bottom wall and a side wall extending from the bottom wall, wherein the reinforcement plate comprises a plurality of molding holes provided in a boundary portion between the bottom wall and the side wall of the reinforcement plate; and
    a frame molded to the reinforcement plate and into each of the plurality of molding holes, such that the frame substantially fills each of the plurality of molding holes,
    wherein each of the plurality of molding holes extends from the boundary portion into both the bottom wall and the side wall.

2. The portable terminal of claim 1, wherein the plurality of molding holes are provided at constant intervals.

3. The portable terminal of claim 1, wherein the frame is formed to have substantially the same height as a backlight unit.

4. The portable terminal of claim 1, wherein the frame comprises a synthetic resin material and the reinforcement plate comprises a metal.

5. The portable terminal of claim 4, wherein the metal comprises stainless steel.

6. The portable terminal of claim 1, wherein the reinforcement plate further comprises a plurality of bottom molding holes provided in the bottom wall of the reinforcement plate.

7. A display module for a portable terminal including a display unit, the display module comprising:
    a reinforcement plate having a bottom wall and a side wall extending from the bottom wall, wherein the reinforcement plate comprises a plurality of molding holes provided in a boundary portion between the bottom wall and the side wall of the reinforcement plate; and
    a frame molded to the reinforcement plate and into each of the plurality of molding holes, such that the frame substantially fills each of the plurality of molding holes,
    wherein each of the plurality of molding holes extends from the boundary portion into both the bottom wall and the side wall.

8. The display module of claim 7, wherein the plurality of molding holes are provided at constant intervals.

9. The display module of claim 7, wherein the frame is formed to have substantially the same height as a backlight unit.

10. The display module of claim 7, wherein the frame comprises a synthetic resin material and the reinforcement plate comprises a metal.

11. The display module of claim 10, wherein the metal comprises stainless steel.

12. The display module of claim 7, wherein the reinforcement plate further comprises a plurality of bottom molding holes provided in the bottom wall of the reinforcement plate.

13. A portable terminal comprising a display module, the display module comprising:
    a reinforcement plate having a bottom wall and a side wall extending from the bottom wall, wherein the reinforcement plate comprises a plurality of holes provided in a boundary portion between the bottom wall and the side wall of the reinforcement plate, the plurality of holes formed at least in part by an edge surface of the bottom wall and an edge surface of side wall; and
    a frame coupled to the reinforcement plate, such that at least a portion of the frame is at least in contact with the edge surface of the bottom wall and the edge surface of side wall of the plurality of holes,
    wherein the plurality of holes extends from the boundary portion into both the bottom wall and the side wall.

14. A portable terminal comprising a display module, the display module comprising:
    a reinforcement plate having a bottom wall and a side wall extending from the bottom wall, wherein the reinforcement plate comprises a plurality of holes provided in a boundary portion between the bottom wall and the side wall of the reinforcement plate, wherein the plurality of holes extend from the bottom wall to the side wall and wherein the plurality of holes comprise a first interior surface extended from the boundary portion into the bottom wall and a second interior surface extended from the boundary portion into the side wall; and a frame coupled to the reinforcement plate, such that at least a portion of the frame inserted to the plurality of holes and the at least a portion of the frame is at least in partial contact with each of the first interior surface and the second interior surface of the plurality of holes.

\* \* \* \* \*